Figure 1:
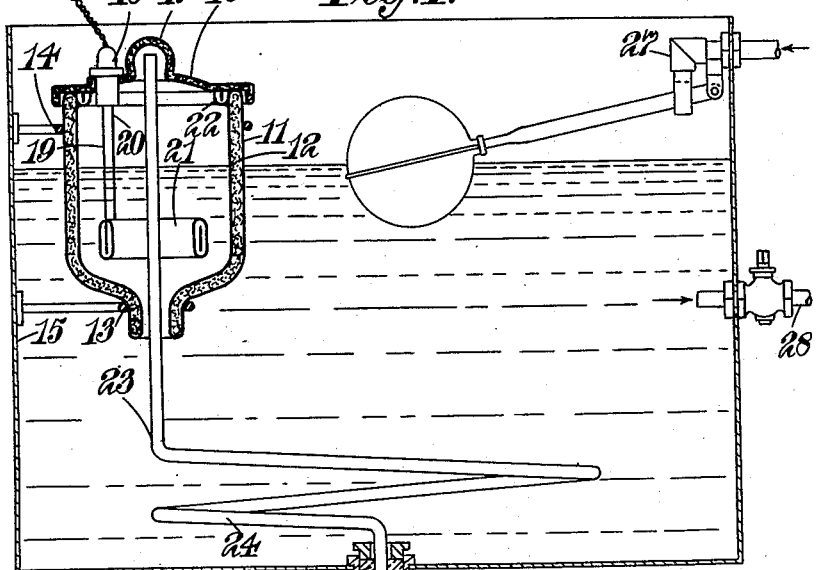

Oct. 8, 1940.    K. COOKSON    2,217,266

WATER DISTILLING APPARATUS

Filed March 13, 1939

Kenneth Cookson
by his attys.
Stebbins Blenko & Parmelee

UNITED STATES PATENT OFFICE 2,217,266

WATER DISTILLING APPARATUS

Kenneth Cookson, Burnham, England

Application March 13, 1939, Serial No. 261,459
In Great Britain August 15, 1938

10 Claims. (Cl. 202—163)

This invention is for improvements in water distilling apparatus and has particular reference to stills for the production of distilled water for domestic purposes while providing at the same time a supply of hot water.

Domestic distilling and water-heating apparatus has already been proposed which comprises a boiler for evaporating water, a condenser for condensing the steam, a vessel to receive the condensed water and a storage vessel for the used condenser water, i. e. for the water which has passed through the cooling jacket of the condenser, this storage vessel being provided with valved means for drawing off water therefrom.

I have now found that considerable economy in heat may be effected in an apparatus for preparing distilled water and for providing a supply of hot water by employing a still in which the boiler is partly immersed in a vessel of water which is to condense the steam evaporated in the boiler. I have further found that for this purpose the water in the boiler may conveniently be heated by means of electricity, e. g. by means of an element of robust construction supported within the boiler which itself may be open at its lower end so as to communicate directly with the vessel containing the cooling water. An advantage of this arrangement is that if the level of the cooling-water is maintained constant, the level of the water in the boiler is maintained constant also and no special feed device is necessary.

The present invention accordingly includes electrically-heated water-distilling apparatus which comprises a vessel to contain cooling-water for condensing steam, a heat-insulated boiler having an opening therein and so supported within said vessel that the water space of the boiler is in direct and free connection with the said cooling-water, an electrical immersion-heater in said boiler, a conduit for leading steam from the steam space of the boiler to a condenser immersed in the said cooling-water and a conduit for leading condensate from the condenser through a wall of the said vessel.

The steam space of the boiler may be connected to the condenser by a pipe which passes through an opening at the bottom of the boiler establishing communication between the water in the boiler and the cooling-water.

In one convenient form of water-distilling apparatus the boiler may be bell-shaped and may be arranged with its wide end upwards. The walls of the boiler may be made of heat-insulating material or the walls may include a heat-insulating layer. The upper end of the boiler may be closed by means of a cover (which may also be made of insulating material) and this cover may carry leads for the electric heating element. The steam from the boiler may be led through a condensing coil in the water surrounding the boiler by means of a pipe passing through the constricted opening at the lower end of the boiler and terminating slightly below the cover. If desired the cover may be provided with a dome-shaped cavity to receive the upper end of the steam pipe and this arrangement will reduce to a minimum the amount of spray carried by the steam to the condensing coil.

The boiler may be made of earthenware or of metal jacketed with heat-insulating material or again may be double-walled, the space between the walls being filled with a heat-insulating material e. g. a granular heat-insulating material such as sand or pumice.

In one embodiment of the invention the boiler may be arranged to float in the cooling-water and will thus rise and fall with alterations in level of the cooling-water.

An inverted annular trough may be provided on the inner wall of the boiler at or towards the lower end thereof to retain a heat-insulating layer of air between the water in the boiler and the cooling-water.

A normal ball cock device may be provided for maintaining the water in the cooling vessel and hence in the boiler at a predetermined height. Means may also be provided for automatically cutting off the electric current if the level of the water in the boiler falls below the heating element or rises to such a height that spray is carried to the condensing coil.

If desired, an overflow may be provided in the cooling vessel so that effective condensation of the steam by the admission of cold water to the cooling vessel takes place when hot water is not being drawn from the cooling vessel.

It will be understood that a number of boilers, each of simple construction, may be arranged within a single cooling tank, the condensed steam passing through a single cooling coil or through separate coils. It will further be understood that the invention may be applied with advantage to a water-distilling apparatus even though it is not desired to make use of the water which has been employed for condensing the steam.

If desired, the boiler may be provided with an internal annular trough to contain the heating element. Such an arrangement enables the still to function even when the water level in the cooling vessel and thence in the main body of the boiler falls temporarily below the level of the heating element and this arrangement has the further advantage that any scale formed in the boiler is largely collected in the trough instead of falling into the vessel containing the cooling-water.

Following is a description by way of example and with reference to the accompanying diagrammatic drawing of several forms of apparatus constructed in accordance with the present invention.

Figure 2:
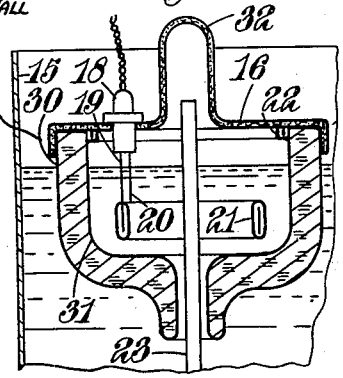
Figure 3:
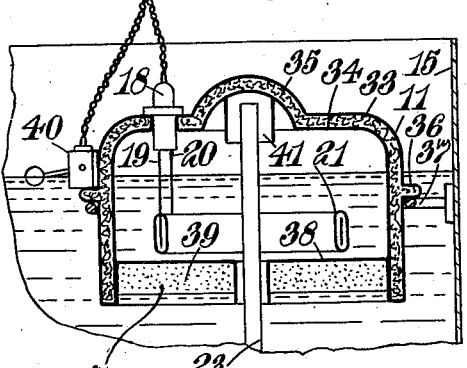
Figure 4:
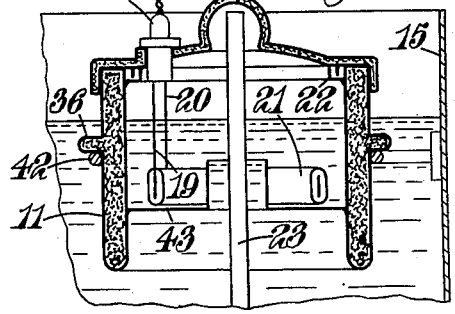
Figure 5:
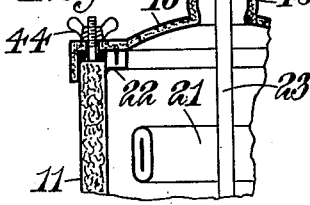

In the drawing:

Figure 1 is a section of one form of apparatus in which the boiler is supported in a tank of cooling-water which is maintained at constant level by means of a ball tap, Figure 2 is a section of an alternative form of boiler in which the boiler floats in the cooling-water, Figure 3 is a section of a boiler which is provided with an insulating layer of air to separate the water in the boiler from the cooling-water, and Figure 4 is a section of a further form of boiler in which the heating element is arranged in an annular trough within the boiler, Figure 5 is a section of a portion of an alternative form of boiler which is supported wholly by the steam pipe.

Similar reference numerals denote similar parts throughout the figures of the drawing.

*Example I*

Referring to Figure 1, the boiler 11 is bell-shaped in form and is made double-walled and is provided with heat-insulating material 12 of cork, sand, asbestos or the like between the walls. The boiler is supported by rings 13 and 14 on the inner wall of a vessel 15 containing cooling-water. The upper end of the boiler is closed by means of a lid 16 made of insulating material and provided with a dome 17 and fitted with an electrical adaptor 18 connected through leads 19 and 20 to a circular strip heating element 21. Steam-tight connection between the cover 16 and the boiler 11 is maintained by means of a water-seal 22. A steam pipe 23 terminates slightly below the inner surface of the dome 17 and is bent in the form of a worm 24, the lower end of which passes through a gland 25 in the bottom of the tank 15 and discharges condensed water into a container 26. The level of the water in the tank 15 is maintained constant by means of the ball tap 27. Hot water is drawn off from the tank 15 as desired by way of the valve 28.

The level of water in the boiler is maintained at the same height as that in the tank 15 at a point which ensures that the heating element 21 remains covered. The boiler may be readily removed for cleaning by lifting it from its supporting rings 13 and 14 without interfering with the steam pipe 23 and cooling worm 24.

*Example II*

In an alternative form of boiler shown in Figure 2 the double walls 30 and 31 are operated by a layer of an heat-insulating material of low specific gravity, for example cork dust, and are so arranged that the whole apparatus, including the electrical adaptor 18, leads 19 and 20 and the heating element 21, floats in the cooling-water.

In this case the lid 16 is conveniently provided with a dome 32 which permits of the desired range of vertical movement of the boiler. This form of boiler may conveniently be employed in conjunction with a cooling vessel which is without any arrangement for maintaining the level of the water in it constant.

*Example III*

In a further form of boiler shown in Figure 3 no special cover is provided, the boiler consisting essentially of a bell-shaped vessel which has double walls 33 and 34 and a packing of heat-insulating material 35 between the walls. The boiler is provided with an outwardly projecting annular rib 36 which rests on a supporting ring 37. An inverted annular trough 38 is provided on the inner wall of the boiler at or towards the lower end thereof and this trough retains a heat-insulating layer 39 of air between the water in the boiler and the cooling-water. A cut-out device 40 is provided in order to cut off the flow of electric current through the heating element as soon as the water falls below a predetermined level. A skirt 41 depending from the dome of the boiler acts as a baffle to trap particles of spray.

*Example IV*

Referring to Figure 4 a double-jacketed and heat insulated boiler 11 is supported by a ring 42 and is provided with an internal annular trough 43 containing the heating element 21. This trough enables the boiler to function even when the water level in the cooling vessel and thence in the main body of the boiler falls temporarily below the level of the heating element and it has the further advantage that any scale formed in the boiler is largely collected in the trough and may be removed periodically.

*Example V*

In an alternative form of boiler part of which is shown in section in Figure 5 the cover 16 is maintained in position by means of wing-nuts 44 and the boiler rests on the steam pipe 23, the upper edge of the pipe being cut away at 45 in order to admit steam to the pipe. Alternatively the pipe 23 is provided, towards its upper end, with one or more holes.

Instead of the form of boiler shown in Figure 5, it may consist of a bell similar to that shown in Figure 3 and in this case no separable cover requiring the use of wing-nuts or the like is employed.

I claim:

1. Electrically-heated water-distilling apparatus which comprises a vessel to contain cooling-water for condensing steam, a heat-insulated boiler having an opening at the bottom thereof and so supported within said vessel that the water space of the boiler is in direct and free connection through the said opening with the said cooling-water, an electrical immersion-heater in said boiler, a conduit for leading steam from the steam space of the boiler through the opening at the bottom of the boiler to a condenser immersed in the said cooling-water and a conduit for leading condensate from the condenser through a wall of the said vessel.

2. Electrically-heated water-distilling apparatus which comprises a vessel to contain cooling-water for condensing steam, a heat-insulated boiler having an opening at the bottom thereof and so supported within said vessel that the water space of the boiler is in direct and free connection with the said cooling-water, an electrical immersion-heater in said boiler, a conduit for leading steam from the steam space of the boiler through the said opening in the bottom thereof to a condensing coil immersed in the said cooling-water, the end of said cooling coil remote from the boiler passing through a wall of the said vessel.

3. Electrically-heated water-distilling apparatus which comprises a vessel to contain cooling-water for condensing steam, a heat-insulated boiler having an opening at the bottom thereof and so supported within said vessel that the water space of the boiler is in direct and free connection with the said cooling-water through said opening and that the boiler is only partially full of water, an electrical immersion-heater in said boiler, a conduit passing from the steam space of the boiler through the said opening at the bottom of the boiler to a condenser immersed in the said cooling-water and a conduit for leading condensate from the condenser through a wall of the said vessel.

4. Electrically-heated water-distilling apparatus which comprises a vessel to contain cooling-water for condensing steam, a bell-shaped heat-insulated boiler supported erect within said vessel so that the water space of the boiler is in direct and free connection with the said cooling-water, an electrical immersion-heater in said boiler, a conduit for leading steam from the steam space of the boiler through the open mouth of the boiler to a condenser immersed in the said cooling-water and a conduit for leading condensate from the condenser through a wall of the said vessel.

5. Electrically-heated water-distilling apparatus which comprises a vessel to contain cooling-water for condensing steam, a heat-insulated boiler of inverted bell-shape form and having an opening at the bottom thereof, means for supporting the boiler within said vessel so that the water space of the boiler is in direct and free connection with the said cooling-water, a domed cover for said boiler, an electrical immersion-heater in the water space of said boiler and suspended from the cover thereof, a conduit for leading steam from the steam space of the boiler through the opening at the bottom of the boiler to a condenser immersed in the said cooling-water and a conduit for leading condensate from the condenser through a wall of the said vessel.

6. Electrically-heated water-distilling apparatus which comprises a vessel to contain cooling-water for condensing steam, a double-walled boiler, the space between the walls being filled with heat-insulating material, an opening at the bottom of said boiler, a support for so maintaining the boiler within the said vessel that the water space of the boiler is in direct and free connection with the said cooling-water, an electrical immersion-heater in said boiler, a conduit terminating near the top of the boiler for leading steam from the steam space of the boiler through the opening at the bottom thereof to a condenser immersed in the said cooling-water and a conduit for leading condensate from the condenser through a wall of the said vessel.

7. Electrically-heated water-distilling apparatus which comprises a vessel to contain cooling-water for condensing steam, a heat-insulated boiler having an opening at the bottom and adapted to float in said cooling-water so that the water space of the boiler is in direct and free connection with the said cooling-water, an electrical immersion-heater in said boiler, a conduit for leading steam from the steam space of the boiler to a condenser immersed in the said vessel and a conduit for leading condensate from the condenser through a wall of the said vessel.

8. Electrically-heated water-distilling apparatus which comprises a vessel to contain cooling-water for condensing steam, a heat-insulated boiler adapted to float in said cooling-water, an opening at the bottom of said boiler connecting the water space of the boiler directly and freely with the said cooling-water, an electrical immersion-heater in the water space of said boiler suspended from the top of said boiler, a vertically extending dome at the top of said boiler, a conduit for leading steam from the dome of the boiler through the opening at the bottom thereof to a condenser immersed in the said cooling-water and a conduit for leading condensate from the condenser through a wall of the said vessel.

9. Electrically-heated water-distilling apparatus which comprises a vessel to contain cooling-water for condensing steam, a bell-shaped heat-insulated boiler supported in the erect position within said vessel, an inverted annular trough secured to the inner wall of the boiler towards the lower end thereof to retain a heat-insulating layer of air between the water in the boiler and the cooling-water, an electrical immersion-heater in the water space of said boiler above the said inverted annular trough, a substantially vertical conduit passing through the opening at the centre of the said annular trough and adapted to lead steam from the steam space of the boiler to a condenser immersed in the said cooling-water and a conduit for leading condensate from the condenser through a wall of the said vessel.

10. Electrically-heated water-distilling apparatus which comprises a vessel to contain cooling-water for condensing steam, a heat-insulating boiler supported within said vessel, an opening at the bottom of said boiler to maintain the water space of the boiler in direct and free connection with said cooling-water, the arrangement of the boiler within the vessel being such that the boiler is never full of water, an internal annular trough secured to the inner wall of the boiler and in the water space thereof, an electrical immersion-heater in the said annular trough, a conduit for leading steam from the steam space of the boiler through the centre of the annular trough to a condenser immersed in the said cooling-water and a conduit for leading condensate from the condenser through a wall of the said vessel.

KENNETH COOKSON.